Aug. 28, 1934.    D. SAMIRAN    1,971,353
FILTER AND FLUID SEGREGATOR ASSEMBLY
Filed Nov. 3, 1930
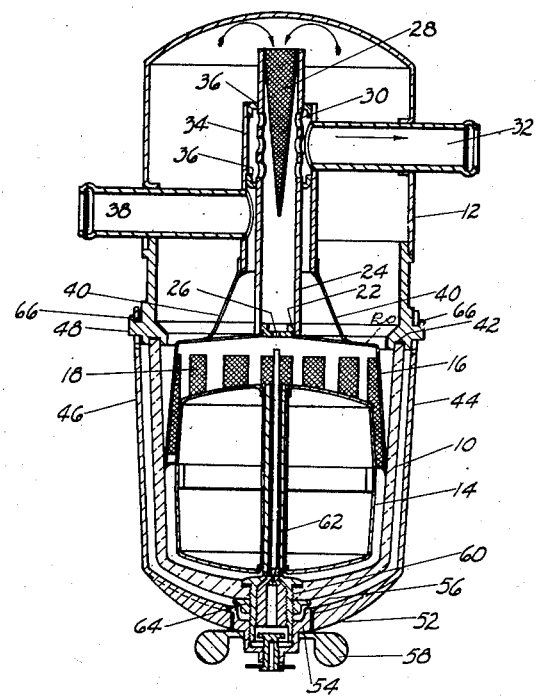
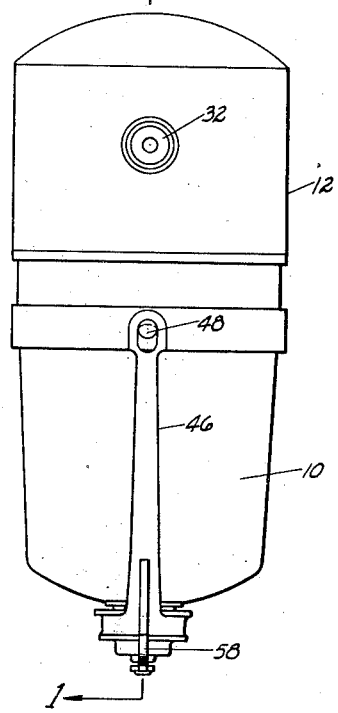
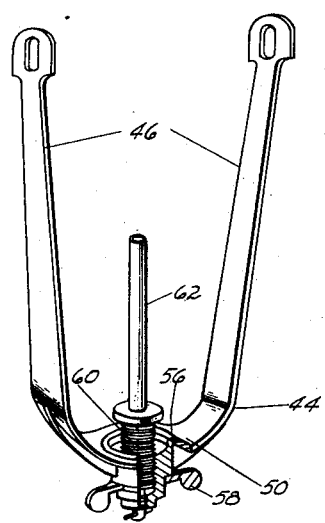
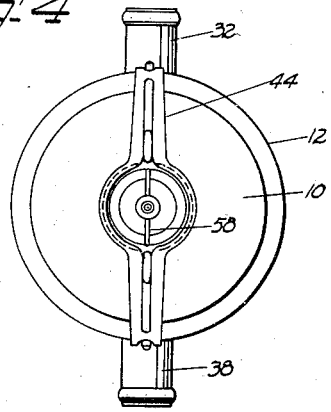
INVENTOR
DAVID SAMIRAN
BY
ATTORNEY Patented Aug. 28, 1934

1,971,353

UNITED STATES PATENT OFFICE 1,971,353

FILTER AND FLUID SEGREGATOR ASSEMBLY

David Samiran, Dayton, Ohio

Application November 3, 1930, Serial No. 493,155

2 Claims. (Cl. 220—57)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to filter and fluid segregator units and more in particular to an improved construction and assembly of the parts of a fluid segregator that is especially useful in connection with the fuel supply systems of fuel propelled vehicles such as aircraft, automobiles, and the like.

It is an object of my invention to provide a novel filter and fluid segregator which may be placed in the gasoline supply system of an airplane and which will catch and retain all sediment, or solid matter that may be carried by the gasoline and at the same time segregate fluids of a specific gravity heavier than that of the gasoline without, however, obstructing the flow of the gasoline.

It is a further object of my invention to provide an apparatus of this character which is so constructed as to permit the flow of gasoline to the outlet of the unit from two different levels of the fluid contained therein, the flow of fluid from the lower of these levels being restricted so as to retard the flow at the region where a segregation of fluids of heavier specific gravity than gasoline takes place.

Another object of my invention is to provide a novel means whereby the assembling and disassembling of the several elements may be readily and easily accomplished.

An embodiment of my invention is shown in the accompanying drawing, in which:—

Fig. 1 is a vertical sectional view on the line 1—1 of Fig. 2;

Fig. 2 is an end view looking from right to left of Fig. 1;

Fig. 3 is an enlarged perspective detail view; and

Fig. 4 is a bottom plan view of the device.

Referring to the drawing, it will be seen that the filter and fluid segregator unit, as illustrated herein, comprise a glass receptacle 10, open at its top and closed by a metallic casing 12, that is secured thereto by strap fastening means. Within the glass receptacle is provided a means for segregating fluids of heavier specific gravity than gasoline which comprises a float operated needle valve mechanism 14, such as described in my copending application, Serial No. 435,243, filed March 12, 1930, and a filter screen 16, having its lower edge in contact with the inner wall of the receptacle for completely enclosing the valve operating mechanism, thus insuring that the gasoline will be filtered prior to its being acted upon by the segregator mechanism.

As shown in Fig. 1, the filter screen comprises a bell-shaped body portion with its open end presenting downwardly and its walls slotted to receive a plurality of sieves 18 of relatively fine mesh, the top 20 thereof forming a deflector for deflecting incoming fluids downward and outward toward the side walls of the chamber, and provided with a projection 22, which serves as a guide for a stand pipe 24 that is in communication with the gasoline contained within the confines of the receptacle and the filter screen 16 by means of a restricted opening 26 in the projection 22. This stand pipe extends upwardly within and substantially to the top of the metallic casing 12, and is open at its upper end for communication with the gasoline in the upper region of the filter unit, a conical shaped screen 28 being provided for filtering the gasoline flowing into the opening. Intermediate of its ends the stand pipe is provided with a plurality of perforations 30, through which incoming fluids from both ends of the stand pipe must pass prior to leaving the unit through the outlet 32. The portion of the stand pipe containing these perforations is telescoped within another tube 34, and is provided at its upper and lower ends with spacers 36, which cooperate with the inner wall of the tube 34 and the outer wall of the stand pipe 24 to form an enclosure for the perforations, which enclosure is in communication with the outlet pipe 32. The lower end of the tube 34 is provided with an opening which serves as a connection for the inner end of an inlet pipe 38 that is in proximity to the deflector portion or top of the filter screen. Both the inlet and outlet pipes have fixed connections at their outer ends with the unit through the casing 12, and thereby serve to support the tube 34. For additionally supporting the tube, as well as to maintain the lower edge of the filter screen 16 contacting with the inner wall of the receptacle, legs 40, made of spring metal strip, are welded at the lower end of tube and in their normal position bear with a slight pressure against the top of the filter screen.

Referring now to the construction of fastening means, best shown in Figs. 1 and 3, the receptacle 10 and casing 12 are held together by permitting the upper peripheral edge of the receptacle to be received within an annular recess 42 formed in the face of the lower edge of the casing, and extending a U-shaped strap 44 from the lower edge of the casing around the bottom of the receptacle. Each leg 46 of the strap is slotted at its upper end to provide a hook or anchor for engagement with the lugs 48 projecting outwardly from the lower edge of the casing. It will be noted that these slots are made slightly longer than the longitudinal dimension of the lugs for a purpose hereinafter described. The bight portion 50 of the strap is provided with an opening 52 to receive a carrier 54, that constitutes, with flange 56 and band knob 58 rigidly fixed thereto, a journal for the strap. The carrier is threaded on a threaded portion 60 of a valve guide 62, which in turn is fixedly connected to the receptacle by a lock nut 64. It will thus be obvious that for disassembling the receptacle from the casing, the knob 58 is rotated in the direction to move the threaded carrier upward on the threaded portion of the valve guide. As the carrier moves upward, the U-strap is carried along with it and when the slotted openings of the strap legs are past the hooked ends 66 of the lugs, manual spreading of the legs will permit the removal of the U-strap container and segregator mechanism as a unit.

It will be obvious that various changes in the detailed construction of the filter and fluid segregator unit may be made by those skilled in the art without departing from the spirit of my invention and that manifestly the method of assembling may be employed in assembling other articles of manufacture as well as filtering units.

For these reasons I do not intend to limit the invention to the specific disclosure herein made.

I claim as my invention:

1. An article of manufacture for the purpose described, comprising a strap means for detachably connecting a casing to a supporting member provided with strap engaging means, comprising a threaded member fixedly connected to said casing and projecting therefrom, a strap having an opening intermediate of its ends to receive said member and having means for complementary engagement with said strap engaging means, and means disposed within said opening and operatively connected to said threaded member for effecting a positive relative sliding movement of said strap and member to attach or detach said casing to or from said supporting member.

2. An article of manufacture for the purpose described, comprising a strap means for detachably connecting a casing to a supporting member provided with strap engaging means, a threaded member fixedly connected to said casing and projecting therefrom, a strap having means for complementary engagement with said strap engaging means, a carrier disposed between said strap and said threaded member and connected thereto and means connected to said carrier for positively effecting a relative movement of said strap and threaded member to attach or detach said casing to or from said supporting member.

DAVID SAMIRAN.